(12) United States Patent
Landermann et al.

(10) Patent No.: US 12,709,482 B2
(45) Date of Patent: Aug. 18, 2026

(54) METHOD AND FACILITY FOR PICKING AND PACKING INDIVIDUAL GOODS CONVEYED OVERHEAD

(71) Applicant: Dürkopp Fördertechnik GmbH, Bielefeld (DE)

(72) Inventors: Frank Landermann, Leopoldshöhe (DE); Marcel Leßmann, Delbrück (DE); Dirk Sieksmeier, Spenge (DE)

(73) Assignee: DÜRKOPP FÖRDERTECHNIK GMBH, Bielefeld (DE)

( * ) Notice: Subject to any disclaimer, the term of this patent is extended or adjusted under 35 U.S.C. 154(b) by 850 days.

(21) Appl. No.: 17/963,484

(22) Filed: Oct. 11, 2022

(65) Prior Publication Data

US 2023/0112137 A1 Apr. 13, 2023

(30) Foreign Application Priority Data

Oct. 12, 2021 (DE) ..................... 10 2021 211 484.9

(51) Int. Cl.
*B65G 1/137* (2006.01)

(52) U.S. Cl.
CPC .................................. *B65G 1/1376* (2013.01)

(58) Field of Classification Search
CPC .................................................... B65G 1/1376
See application file for complete search history.

(56) References Cited

U.S. PATENT DOCUMENTS

| | | | | |
|---|---|---|---|---|
| 5,646,398 | A * | 7/1997 | Sieksmeier | G06M 1/101 377/6 |
| 5,687,851 | A * | 11/1997 | Schonenberger | B65G 1/1371 209/912 |
| 5,799,769 | A * | 9/1998 | Heer | B65G 19/025 198/465.4 |
| 9,284,701 | B1 | 3/2016 | Newberry et al. | |
| 9,637,137 | B2 * | 5/2017 | Park | B61B 10/022 |
| 10,427,873 | B1 * | 10/2019 | Mause | B65G 1/1378 |
| 11,866,254 | B2 * | 1/2024 | Reischl | B65G 17/32 |
| 12,091,246 | B2 * | 9/2024 | Altwegg | B65G 43/08 |
| 2013/0264171 | A1 * | 10/2013 | Wend | B65G 47/29 198/459.6 |
| 2014/0195032 | A1 * | 7/2014 | Horn | A24C 5/35 700/115 |

(Continued)

FOREIGN PATENT DOCUMENTS

| | | | |
|---|---|---|---|
| DE | 102005006455 | A1 | 8/2006 |
| DE | 102008025778 | A1 | 12/2009 |

(Continued)

*Primary Examiner* — Kyle O Logan
(74) *Attorney, Agent, or Firm* — McGlew and Tuttle, P.C.

(57) ABSTRACT

A method for order picking and packing individual goods conveyed overhead. The Method conveys the individual goods overhead in an overhead conveyor facility by means of overhead adapters, providing the individual goods of at least one order in a preparation buffer, conveying the individual goods of the at least one order onto a transport trolley which can be coupled to the preparation buffer in a trolley station, uncoupling the transport trolley from the trolley station, transporting the transport trolley with the individual goods of the at least one order to a packing place and packing the individual goods into orders at the packing place.

9 Claims, 10 Drawing Sheets

(56) References Cited

U.S. PATENT DOCUMENTS

| | | | | |
|---|---|---|---|---|
| 2015/0021147 | A1* | 1/2015 | Ihrefors | B65G 47/8823 198/678.1 |
| 2017/0140966 | A1* | 5/2017 | Li | H01L 21/67766 |
| 2017/0283173 | A1* | 10/2017 | Otto | B65G 19/025 |
| 2019/0377335 | A1* | 12/2019 | Voelker | G05B 19/41895 |
| 2020/0004252 | A1 | 1/2020 | Aljallis et al. | |
| 2020/0024074 | A1* | 1/2020 | Herzog-Lang | B65G 9/002 |
| 2020/0172346 | A1* | 6/2020 | Sigrist | B65G 37/02 |
| 2020/0216262 | A1* | 7/2020 | Sigrist | B65G 17/485 |
| 2021/0101756 | A1* | 4/2021 | Merten | B65G 43/08 |
| 2021/0300682 | A1* | 9/2021 | Lindley | B65G 47/69 |

FOREIGN PATENT DOCUMENTS

| | | | |
|---|---|---|---|
| DE | 102015110453 | A1 | 12/2016 |
| DE | 102018201676 | A1 | 8/2019 |
| DE | 102018209268 | A1 | 12/2019 |
| DE | 102019214088 | A1 | 3/2021 |
| EP | 3581524 | A1 | 12/2019 |
| FR | 3081455 | A1 | 11/2019 |
| WO | 2012106746 | A1 | 8/2012 |

* cited by examiner

METHOD AND FACILITY FOR PICKING AND PACKING INDIVIDUAL GOODS CONVEYED OVERHEAD

CROSS-REFERENCES TO RELATED APPLICATIONS

This application claims the priority of German Patent Application, Serial No. DE 10 2021 211 484.9, filed Oct. 12, 2021, the content of which is incorporated herein by reference in its entirety as if fully set forth herein.

FIELD OF THE INVENTION

The invention relates to a method and a facility for picking and packing individual goods conveyed overhead.

BACKGROUND OF THE INVENTION

Known overhead conveyor facilities are used for order picking of individual goods conveyed overhead, by means of which the individual goods are retrieved from a warehouse, sorted according to orders and made available at packing places. At the packing places, the individual goods are manually packed into a shipping container and, if necessary, refined by value-added services (VAS). These include, for example, labelling and/or the preparation of customs documents for dispatch. The time required for value-added services can vary greatly depending on the order and, in particular, can lead to delays at the packing places. Meanwhile, this packing place is blocked for the packing of other orders. In order to create sufficient packing capacity, it is therefore necessary to provide a large number of packing places. This increases the capital expenditure for such an overhead conveyor facility.

SUMMARY OF THE INVENTION

It is an object of the present invention to improve the picking and packing of individual goods conveyed overhead, and in particular to enable the process to be carried out economically and, in particular, with high process reliability.

This object is achieved according to the invention by a method for order picking and packing individual goods conveyed overhead, comprising the following method steps overhead conveying of the individual goods in an overhead conveyor facility by means of overhead adapters, providing the individual goods of at least one order in a preparation buffer, conveying the individual goods of the at least one order onto a transport trolley which can be coupled to the preparation buffer in a trolley station, uncoupling the transport trolley from the trolley station, transporting the transport trolley with the individual goods of the at least one order to a packing place, packing the individual goods into orders at the packing place.

This object is further achieved by a facility for order picking and packing individual goods comprising a preparation buffer having a conveyor rail for preparing the individual goods of at least one order, wherein the individual goods can each be conveyed in a suspended manner along the conveyor rail by means of an overhead adapter, a transport trolley which is designed to be mobile and has a receiving rail for receiving the overhead adapters carrying the individual goods of the at least one order, a trolley station which is connected to the preparation buffer in terms of conveying technology, wherein a transport trolley can be coupled in each case in the trolley station.

According to the invention, it has been recognised that it is possible to uncouple packing places from an overhead conveyor system by means of a transport trolley, in particular a mobile one. In particular, it has been recognised that it is not necessary for the packing places to be directly connected to the overhead conveyor system of the overhead conveyor facility in order to pick and pack the individual goods conveyed overhead. The mobile transport trolleys enable an indirect connection between the overhead conveyor system of the overhead conveyor facility and the packing places where the individual goods are packed into orders, in particular into shipping containers. The packing can be done manually and in particular be finished with value-added services. In particular, it is possible to arrange the packing places spatially remote from the overhead conveyor facility, in particular in a spatially distant region of a hall, especially in a hall separate from the overhead conveyor facility. In particular, it has been recognised that it is not necessary to provide a conveying infrastructure at the packing places in order to reliably pick and pack the individual goods. This reduces the amount of equipment required.

Due to the fact that the individual goods, which are each conveyed along the overhead conveyor facility by means of a hanging adapter and in particular can be clearly identified as a result, are arranged with the overhead adapter on the transport trolley, the clear identification of the individual goods is maintained during the transport to the packing places. In particular, the individual goods are picked up hanging from overhead adapters on the coupled transport trolley and conveyed by means of the transport trolley. In particular, the overhead adapters are held in a receiving rail of the transport trolley. This means that the sequence of individual goods created in the overhead conveyor facility is maintained on the transport trolley.

This makes it possible in particular for the packing place to be physically uncoupled from the overhead conveyor facility and in particular spatially separated from the overhead conveyor facility. In particular, it is ensured that despite the spatial separation and the uncoupling of the packing place from the overhead conveyor facility in terms of conveying technology, the individual goods are provided at the packing places without any loss of quality in terms of conveying technology, i.e. in particular in the desired order and in particular sorted according to orders. In particular, the assignment of the individual goods to an order is maintained by means of the transport with the transport trolley to the packing places. This simplifies the packing of the individual goods into an order. The method is process-reliable. In particular, it is not necessary to sequence the individual goods again at the packing places. The method is efficient.

The overhead adapters enable individualised, i.e. separated, conveying of the individual goods. Overhead adapters of this type for the overhead conveyor facility are known from DE 10 2005 006 455 A1. For details of the design of the overhead adapter and its function for conveying along the overhead conveyor facility, explicit reference is made thereto.

The transport trolley can be coupled with a preparation buffer in which individual goods of at least one order are provided. When the transport trolley is coupled with the preparation buffer, a common overhead conveyor line is formed from the preparation buffer to the transport trolley. Overhead adapters can be easily and directly loaded from the preparation buffer onto the transport trolley. In particular, the transport trolley can be coupled in terms of conveying technology with a conveyor rail of the preparation buffer.

This means that the conveyor rail of the preparation buffer and the receiving rail of the transport trolley form a common conveyor system, in particular a common overhead conveyor system. In particular, the receiving rail of the transport trolley is designed to correspond to the conveyor rail of the preparation buffer. In particular, the receiving rail and the conveyor rail have a similar and, in particular, a functionally identical rail profile. In particular, the overhead adapters can be displaced from the conveyor rail of the preparation buffer into the receiving rail of the transport trolley without collision and/or interruption when the transport trolley is coupled to the preparation buffer. A trolley station is used for this purpose, by means of which the transport trolley can be coupled with the overhead conveyor system of the overhead conveyor facility and, in particular, can be integrated into the overhead conveyor system. This enables the individual goods of the at least one order to be moved from the preparation buffer of the overhead conveyor facility to the transport trolley in a process-safe, reliable and fast manner. The preparation buffer is in particular part of the overhead conveyor facility. The preparation buffer is in particular formed by a conveyor rail of the overhead conveyor facility.

In the trolley station, the transport trolley is filled with individual goods. The trolley station is a filling station. The transport trolley can be mechanically and logically uncoupled from the trolley station for transport. Due to the fact that the transport trolley is designed to be mobile, the transport trolley with the individual goods arranged thereon can be transported directly to one of the packing places. The transport of the transport trolley can be carried out by the transport trolley having a frame that is arranged on rollers and can be rolled. In addition or alternatively, the transport trolley may have a coupling member in order to be coupled with an automated guided vehicle (AGV) that transports the transport trolley, in particular in an automated manner, to one of the packing places. Alternatively, it is also possible for the transport trolley to have its own traction drive in order to travel, in particular automatically and autonomously, from the overhead conveyor facility to one of the packing places. In particular, it is possible to provide the transport trolley itself with its own identification means, in particular in the form of a one or two-dimensional barcode or in the form of an RFID chip. The identification means serves to identify the transport trolley with the individual goods located thereon, in particular after the transport trolley has been loaded, i.e. filled, with the individual goods. In particular, identification elements of the individual goods are logically linked with the identification means of the transport trolley in the control unit. In particular, it is possible to determine a position of the individual goods even if they have already been discharged from the overhead conveyor facility by identifying and locating the transport trolley.

Individual goods that are conveyed overhead are, in particular, clothing that can be conveyed suspended on a clothes hanger on an overhead adapter. This type of goods is referred to as hanging goods. Individual goods that are conveyed in a suspended manner can also be so-called lying goods that are packed in a bag or cardboard box and cannot be arranged on a hanger. Such lying goods can be accommodated in a conveyor bag, wherein the conveyor bag is conveyed by means of an overhead adapter. A conveyor bag of this type is known, for example, from DE 10 2018 201 676 A1. With regard to constructional details and operating principle of this conveyor bag, express reference is made thereto.

A method wherein exclusively individual goods of at least one completed order are arranged on the transport trolley, ensures an efficient packing process at the packing place. Individual goods of at least one completed order and in particular of a plurality of completed orders are arranged on the transport trolley. In particular, individual goods of at least three orders, in particular of at least five orders, in particular of at least ten orders, in particular of at least 15 orders, in particular of at least 20 orders, in particular of at least 25 orders and in particular of up to 30 completed orders or more are arranged on the trolley.

A method wherein the individual goods are provided in the preparation buffer sorted according to orders, enables efficient discharge of the individual goods of completed orders from the overhead conveyor facility.

A method comprising an identification of the individual goods, in particular before they are fed to the preparation buffer, increases the process reliability. The individual goods are identified in particular by an identification unit which can communicate with an identification element which is arranged in particular in the overhead adapter which is assigned to the conveyor bag and is in particular integrated therein. It is advantageous if the identification of the individual goods takes place before the individual goods are discharged from the overhead conveyor system, i.e. in particular before the individual goods are conveyed onto the transport trolley. Identification before the individual goods are fed to the preparation buffer is particularly advantageous. The identification unit can advantageously be integrated into the overhead conveyor facility and, in particular, be arranged in the region of the preparation buffer.

A method comprising a removal of the individual goods from the transport trolley at the packing place, enables an efficient packing process. In particular, the individual goods are removed from the conveyor bags and/or clothes hangers are removed from overhead adapters. The emptied conveyor bags and/or emptied overhead adapters, i.e. overhead adapters to which clothes hangers were previously attached, remain on the transport trolley. Such an emptied transport trolley can be returned to the overhead conveyor facility and used to transport individual goods again.

A method comprising an emptying of the transport trolley at an emptying station, simplifies the reuse of the transport trolley. In particular, empty overhead adapters and/or empty conveyor bags are removed from the transport trolley, in particular by means of a sliding drive. The transport trolley emptied in this manner can then be coupled again with the preparation buffer in the trolley station and loaded with individual goods and transported to packing places.

A method wherein the individual goods are slid onto the transport trolley from the preparation buffer by means of a sliding drive, ensures a reliable, automatable and/or fast transfer of the individual goods from the preparation buffer to the transport trolley. A sliding drive is designed to be robust and non-complex.

A facility for order picking and packing individual goods comprising a preparation buffer having a conveyor rail for preparing the individual goods of at least one order, wherein the individual goods can each be conveyed in a suspended manner along the conveyor rail by means of an overhead adapter, a transport trolley which is designed to be mobile and has a receiving rail for receiving the overhead adapters carrying the individual goods of the at least one order, a trolley station which is connected to the preparation buffer in terms of conveying technology, wherein a transport trolley can be coupled in each case in the trolley station essentially has the advantages of the method for order picking and packing individual goods conveyed overhead, comprising the following method steps overhead conveying of the individual goods in an overhead conveyor facility by means of overhead adapters, providing the individual goods of at least one order in a preparation buffer, conveying the individual goods of the at least one order onto a transport trolley which can be coupled to the preparation buffer in a trolley station, uncoupling the transport trolley from the trolley station, transporting the transport trolley with the individual goods of the at least one order to a packing place, packing the individual goods into orders at the packing place.

The transport trolley can be coupled to the preparation buffer by means of the trolley station, in particular such that a receiving rail of the transport trolley is connected in terms of conveying technology to a conveyor rail of the preparation buffer. In the coupled arrangement, the individual goods arranged at the overhead adapters can be conveyed directly, in an uncomplicated and, in particular, error-proof manner from the conveyor rail of the preparation buffer to the receiving rail of the transport trolley.

It is advantageous if the receiving rail of the transport trolley has an overhead adapter capacity that is at least as large as an overhead adapter capacity of the conveyor rail of the preparation buffer. This ensures that all overhead adapters from the preparation buffer can be reliably delivered to the transport trolley. The overhead adapter capacity of the receiving rail can also be larger than that of the conveyor rail.

A facility comprising a plurality of packing places for packing the individual goods into orders, enables the advantageous uncoupling of the packing process from the overhead conveyor system. The packing places can in particular be of non-complex design. In the simplest case, for example, it is sufficient to have a table at which an operator transfers the individual goods, which are transported to the packing place by means of the transport trolley, into a shipping container. The transport trolley can be transported flexibly and freely to one of the packing places. In particular, the transport trolley is transported to one of the packing places in a controlled manner by means of the control unit, in particular to a free packing place or to a packing place with a short or minimum waiting time. Due to the fact that the packing place can be designed in an uncomplicated manner, it is possible to provide a large number of packing places in a cost-saving manner. In particular, cost savings result from the fact that it is not necessary to connect the packing places to the overhead conveyor system. The packing capacity can be increased disproportionately at comparatively low cost. In particular, it is possible to respond to heterogeneous packing capacities, which are caused in particular by different processing steps during packing.

An emptying station for emptying the transport trolley, enables the efficient reuse of the transport trolleys. The emptying station can be integrated into the trolley station. It is also possible to design the emptying station separately from the trolley station.

A sliding drive for sliding the individual goods from the preparation buffer onto the transport trolley, enables the individual goods to be conveyed from the preparation buffer onto the transport trolley in a simple and, in particular, reliable and robust manner. A sliding drive provided for this purpose is in particular a component of the preparation buffer. In particular, the sliding drive is designed with a sliding member that can be displaced along the transport rail of the preparation buffer and which slides the overhead adapters from the transport rail of the preparation buffer onto the receiving rail of the transport trolley.

A facility wherein the trolley station has at least one coupling member which is switchable between a coupling position and an uncoupling position, ensures reliable coupling of the transport trolley in the trolley station. In particular, the coupling process of coupling members is switchable. This increases the process reliability, in particular of the coupling and uncoupling. In a coupling position of the coupling members, in which the transport trolley is coupled in the trolley station, in particular the transport rail and the receiving rail are connected to each other in terms of conveying technology. In particular, the transport rail and the receiving rail, which in particular have the same, in particular an identical, profile cross-section, are arranged in relation to each other in such a manner that direct transfer of the overhead adapters is possible. In the coupling position, the transport rail of the preparation buffer and the receiving rail of the transport trolley form a common conveyor line. In particular, the two rails, each of which is of linear design, are essentially aligned with each other. This means that in terms of conveying technology, a direct transition is possible between one end of the transport rail and one beginning of the receiving rail. Essentially aligned means that the respective longitudinal axes of the transport rail and the receiving rail are arranged parallel, wherein angular deviations of at most 15°, in particular at most 10°, in particular at most 5° and in particular at most 3° are also possible.

The coupling members are in particular movably and in particular pivotably attached to the overhead conveyor facility. In particular, the coupling members are designed in the form of a folding hinge and are suitable for bridging a gap along the conveying direction between the transport rail and the receiving rail in the coupling position. In addition, the coupling members are suitable for compensating vertical height differences between the receiving rail and the transport rail.

In particular, the coupling members are designed in signal connection with the control unit and/or with an integrated sensor element such that they detect the positioning of the transport trolley in the trolley station and are switched from the uncoupled position to the coupled position as a function thereof.

An identification unit for identifying the individual goods, wherein the identification unit is located in particular upstream of the preparation buffer, ensures process-reliable picking of the individual goods of different orders and, in particular, process-reliable transport of the individual goods from the overhead conveyor facility to the packing places. It is ensured that the assignment of the individual goods to the orders is maintained. There is no need to re-sort the individual goods at the packing places. This reduces the overall effort.

A locking unit for locking the transport trolley in the trolley station, wherein the locking unit has at least one locking member which can be switched between a locking position and an unlocking position, ensures a mechanically stable arrangement of the transport trolley in the trolley station. This ensures reliable conveyance of the individual goods onto the transport trolley. A disturbance of the filling process of the transport trolley in the trolley station is excluded.

A control unit for automated provision of the individual goods in the preparation buffer and/or for automated coupling and/or loading of the transport trolley with the individual goods, enables the process to be carried out in an automated manner. For this purpose, a control unit is provided which is in bidirectional signal communication in particular with the preparation buffer, the packing places and at least one identification unit.

Both the features indicated in the patent claims and the features indicated in the following embodiment examples of a facility according to the invention are each suitable, either on their own or in combination with one another, for further developing the subject matter according to the invention. The respective combinations of features do not constitute any restriction with regard to the further embodiments of the subject matter of the invention, but are essentially merely exemplary in character.

Further features, advantages and details of the invention will be apparent from the following description of embodiments based on the drawing, in which:

DESCRIPTION OF THE PREFERRED EMBODIMENTS

Figure 1:
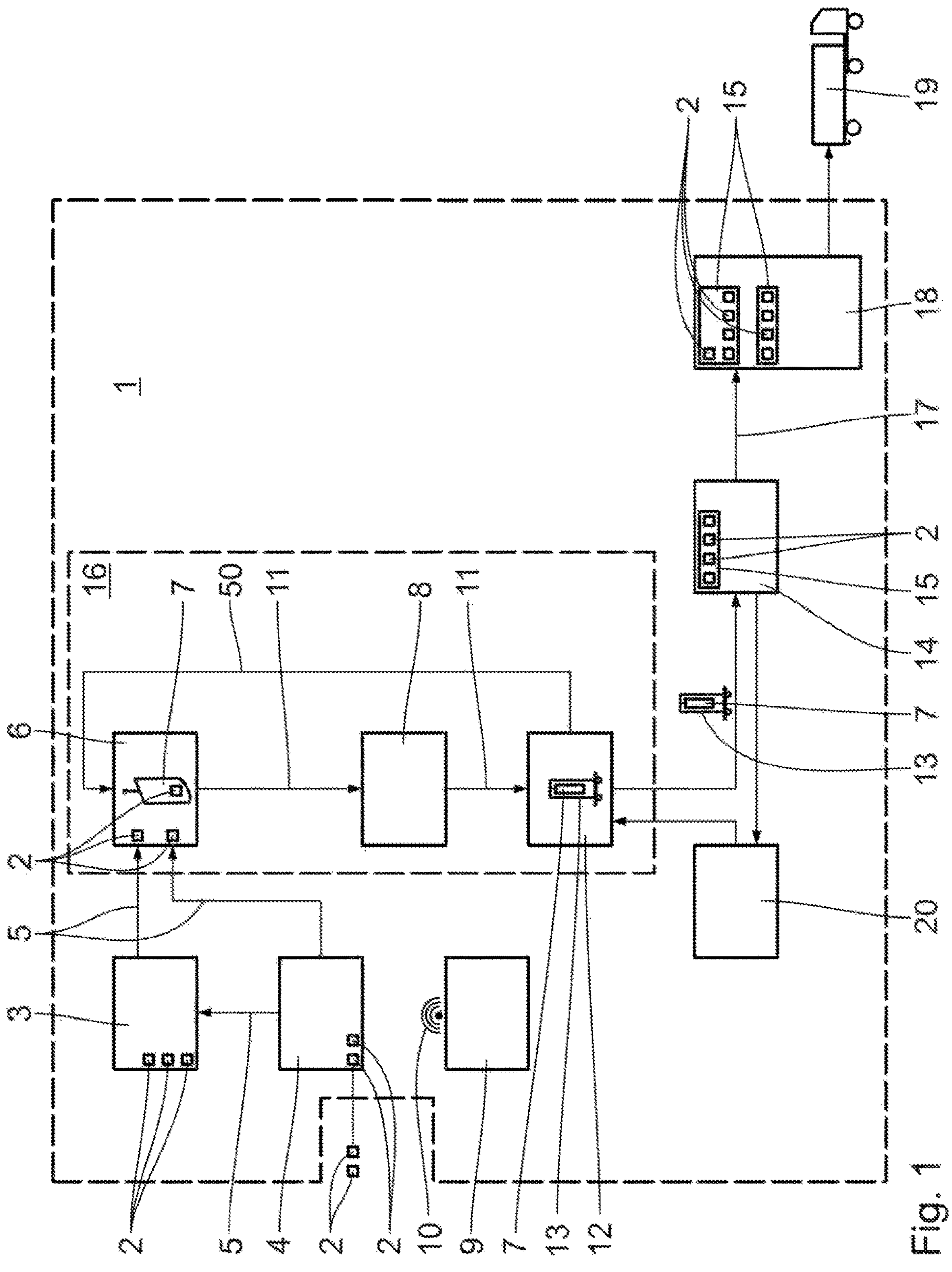
FIG. 1 shows a schematic view of a facility according to the invention.
Figure 2:
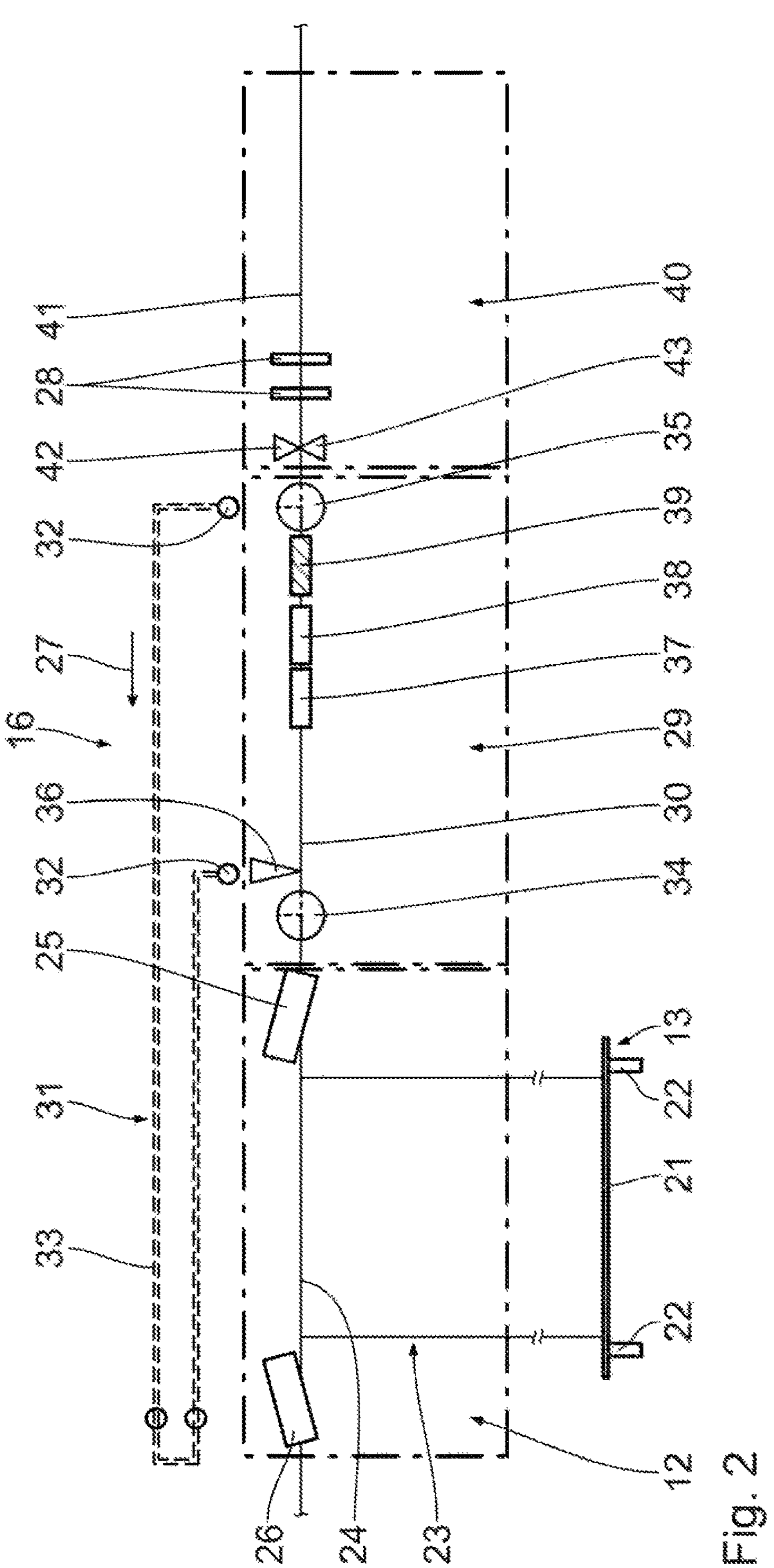
FIG. 2 shows a schematic illustration of the facility in FIG. 1 with a preparation buffer and a trolley station according to a first embodiment example.
Figure 3:
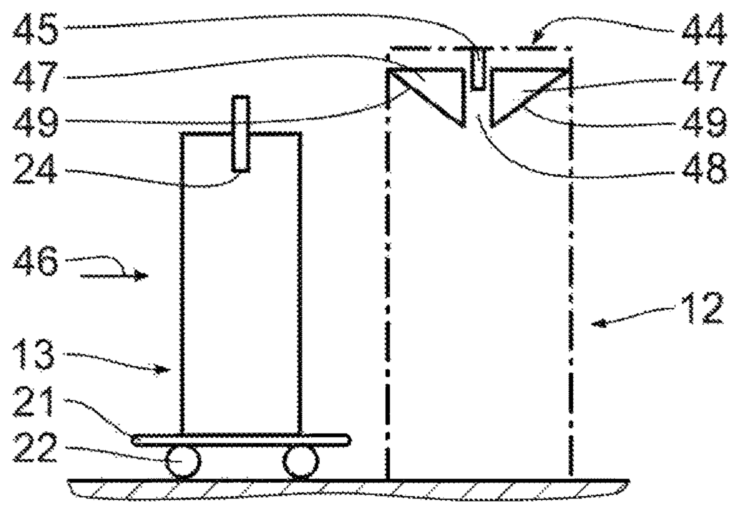
FIG. 3 shows a schematic side view of the trolley station according to FIG. 2 with a transport trolley being fed in, FIG. 4, 5 show illustrations corresponding to FIG. 3 of feeding and locking of the transport trolley into the trolley station.
Figure 4:
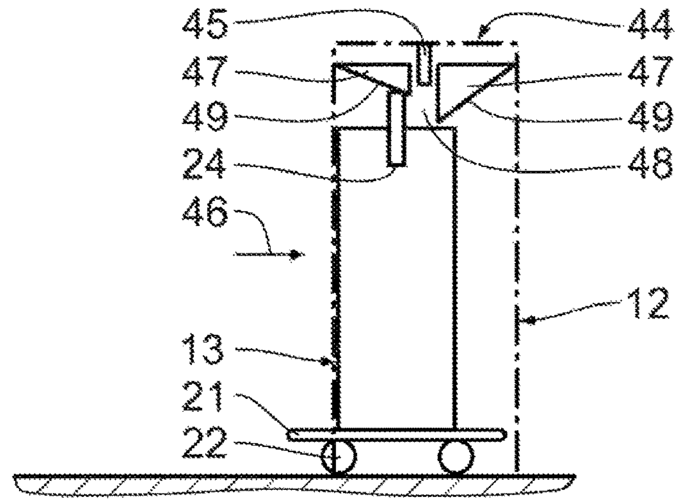

A facility marked in its entirety as 1 in FIG. 1 is used for picking and packing individual goods 2. The individual goods 2 are also referred to as articles. The facility 1 comprises a warehouse 3 in which the individual goods 2 are stored. The warehouse 3 can be designed as a manual warehouse or as an automatic warehouse. The facility 1 also has an incoming goods zone 4, via which individual goods 2 are fed to the facility 1, in particular from an external source. Returned goods can also be fed to the incoming goods zone 4.

The incoming goods zone 4 is connected to the warehouse 3 by means of a conveyor system 5. The conveyor system 5 is, for example, a conveyor belt or a manual feed of the individual goods 2, which in particular can also be present in packages in the incoming goods zone 4, to the warehouse 3.

The facility 1 further comprises a feed station 6, at which the individual goods are fed into a carrying device 7, which is designed as a transport bag. The transport bag 7 is also referred to as a conveyor bag. The feed station 6 is also referred to as a loading station, as the transport bags 7 are each loaded with an article 2. The individual goods that are loaded into the conveyor bags 7 are also referred to as lying goods. The lying goods are conveyed in a suspended manner by means of the conveyor bags 7. Additionally or alternatively, so-called hanging goods can be fed in at the feed station 6. Hanging goods are individual goods that are conveyed suspended in particular from a clothes hanger.

The feed station 6 is connected both to the incoming goods zone 4 and to the warehouse 3, each independently by a conveyor system 5. By means of the conveyor system 5, the individual goods 2 are conveyed from the warehouse 3 and/or the incoming goods zone 4 to the feed station 6.

It is also possible to design the facility 1 without a conveyor system between the feed station 6 and the incoming goods zone 4 or the warehouse 3. In this case, the individual goods 2 are conveyed manually from the incoming goods zone 4 and/or the warehouse 3 to the feed station 6, in particular by means of spring floor trolleys or pallet lifting trucks.

The carrying devices 7 and/or the clothes hangers can each be transported separately in a rail system by means of a roller adapter not shown in detail in FIG. 1. The roller adapter is also referred to as an overhead adapter. The carrying devices 7 and/or the clothes hangers are transported in a suspended manner. It is advantageous if the carrying devices 7 can each be clearly identified by means of an identification device. For this purpose, the roller adapter can each have an integrated RFID chip on which identification data is stored. The identification data can be recorded by suitable reading devices, which are arranged in particular along the transport path of the overhead conveyor facility 1, in order to track and control the conveying path of the carrying devices 7 along the overhead conveyor facility 1.

For suspended conveyance, the carrying devices 7 and/or the clothes hangers are each connected to a roller adapter in a form-fitting manner. In particular, the carrying devices 7 and/or the clothes hangers each have a hook that can be inserted into a corresponding recess of the roller adapter. A clothes hanger with a garment hanging thereon can also be hooked onto the recess of the roller adapter. In particular, each carrying device 7 serves to convey exactly one piece of individual goods 2.

Alternatively, the roller adapter can also be hook-shaped and be hung in a recess of the carrying device 7 and/or the clothes hanger.

The facility 1 comprises a sorting unit 8 which serves to sort the carrying devices 7, i.e. to change the sequence of the individual goods in the flow of goods. The sorting unit 8 can be designed in various ways. The sorting unit 8 is also referred to as a bag sorter. The sorting unit 8 may have a plurality of accumulation lines arranged in parallel and/or in series and/or one or more revolving gyroscopes. Additionally or alternatively, the sorting unit 8 can be designed as a matrix sorter.

The sorting unit 8 serves in particular to combine the individual goods 2 into logical groups. In particular, the individual goods 2 are combined into groups of individual goods 2 that form an order 15. Groups of individual goods 2 that are part of an order 15 can also be formed in the sorting unit 8.

The facility 1 comprises a central control unit 9, which is in signal communication in particular with the reading devices along the overhead conveyor facility 1. The signal connection can be wired or wireless. A wireless, radio-linked signal connection is shown in FIG. 1 with a symbol 10 for radio transmission.

The facility 1 comprises a rail system 11 by means of which the carrying devices 7 are conveyed from the feed station 6 to the sorting unit 8 and through the sorting unit 8. The rail system 11 also serves to connect the sorting unit 8 to a trolley station 12 in terms of conveying technology.

In particular, a plurality of trolley stations 12 are provided. The trolley stations 12 are each directly coupled to the rail system 11 of the facility 1. At the trolley station 12, overhead adapters with individual goods 2 are conveyed from the rail system 11 onto a transport trolley 13. The transport trolley 13 is drivable and is driven to one of a plurality of packing places 14 with the individual goods 2 attached thereto. The transport trolley 13 can be pulled or pushed manually or by means of a drive vehicle. The transport trolley 13 can also have its own traction drive.

The feed station 6, the sorting unit 8 and the trolley station 12 are part of an overhead conveyor facility 16, which is part of the facility 1.

At the packing places 14, the articles 2 are taken from the transport trolleys 13 and packed, in particular manually. The individual goods 2 are packed in accordance with the order.

The transport trolleys 13 from which the individual goods 2 have been removed are conveyed from the packing places 14 with empty overhead adapters and/or empty conveyor bags 7 to an emptying station 20. In the emptying station 20, the empty overhead adapters and/or empty conveyor bags 7 are removed from the respective transport trolleys 13, i.e. the transport trolleys 13 are emptied. The transport trolleys 13 emptied in this way are made available at the trolley station 12 for being refilled with clothes hangers and/or conveyor bags 7. It is also possible that the emptying station 20 is integrated in the trolley station 12.

In terms of conveying technology, a discharge line 17 connects an outgoing goods zone 18 to the packing places 14. The orders 15 with the individual goods 2 can leave the facility 1 via the outgoing goods zone 18. The orders 15 processed in the facility 1 can have different articles and different numbers of articles. Orders 15 from the outgoing goods zone 18 can be transported away by external means of transport 19, such as lorries.

The trolley station 12 is explained in more detail below with reference to FIGS. 2 to 12.

The trolley station 12 is part of the overhead conveyor facility 16. The trolley station 12 enables a transport trolley 13 to be accommodated.

The transport trolley 13 is designed to be mobile and has a mobile base with a carriage 21 and several, in particular four, drive rollers 22. According to the embodiment example shown, the transport trolley 13 is designed to be passive, i.e. without its own traction drive. By means of the drive rollers 22, the transport trolley 13 can be pulled or pushed manually or by means of a transport vehicle. However, the transport trolley 13 can also have its own traction drive.

The transport trolley 13 has a portal-like holding frame 23 which is attached to the carriage 21. The holding frame 23 has a receiving rail 24 on which overhead adapters 28 can be attached in a suspended manner. The transport trolley 13 also has a guide profile 60 which is arranged above the receiving rail 24. The guide profile 60 is oriented transversely and in particular perpendicularly to the receiving rail 24. The guide profile 60 is oriented perpendicular to the image plane according to FIG. 11.

The trolley station 12 has a first coupling member 25 and a second coupling member 26. The coupling members 25, 26 can be used to couple the transport trolley 13 in the trolley station 12.

Such a coupling process of the transport trolley 13 in the trolley station 12 is explained in more detail with reference to FIGS. 11 and 12.

It is essential that the coupling members 25, 26 can each be moved between a coupling position and a decoupling position and, in particular, can be switched. For this purpose, the coupling members 25, 26 are each arranged in the form of a drawbridge on the conveyor rail. The coupling position according to FIG. 12 corresponds to the lowered arrangement of the drawbridge. In this arrangement the coupling members 25, 26 are in a working position. The uncoupling position according to FIG. 11 corresponds to the drawn-up arrangement of the drawbridge.

The coupling members 25, 26 are essentially identical and are arranged opposite each other along the conveying direction 27. The coupling members 25, 26 are thus arranged mirror-symmetrically to a normal plane of the conveying direction 27.

The coupling members 25, 26 are in particular designed to be pneumatically pivotable, in particular designed to be pneumatically switchable and transferable from the uncoupling position to the coupling position. In the event that the trolley 13 is arranged in the trolley station 12 and is to be coupled, the coupling members 25, 26 are automatically displaced, in particular controlled by the control unit 9, into the coupling position, i.e. folded downwards. Sensors not shown in more detail can be provided for this purpose, which serve to detect the transport trolley 13 in the trolley station 12.

The coupling members 25, 26 each have an axial support ridge 51 with which the coupling members 25, 26 rest on an upper side of the receiving rail 24 in the coupling position. The coupling position is defined by the contact of the coupling member 25, 26 with the upper side of the receiving rail 24. The support ridge 51 forms a vertical stop for the coupling members 25, 26 on the receiving rail 24. The axial support ridge 51 is part of a substantially U-shaped receptacle 58. On each side of the support ridge 51, in particular in one piece, vertically downward extending side walls are arranged, which in particular have run-in slopes, i.e. form a mouth funnel. This improves the coupling of the coupling members 25, 26 to the receiving rail 24. The U-shaped design of the receptacle 58 ensures that the receiving rail 24 can be enclosed laterally by the side walls. The coupling members 25, 26 ensure a stable and reliable coupling of the transport trolley 13 in the trolley station 12. The coupling position can be detected by sensors. A bridging member 52 that is axially displaceable in the coupling member 25, 26 can be axially displaced, in particular as soon as the coupling position is reached. The axial displacement of the bridging member 52, i.e. along the conveying direction 27, is performed by means of an axial actuating member 59, which is integrated in the respective coupling member 25, 26. The bridging member 52 serves to close axial gaps at the transition zone to the receiving rail 24, i.e. along the conveying direction 27.

The receiving rail 24 is seamlessly integrated into the overhead conveyor system by means of the coupling members 25, 26. In particular, the respective bridging element 52 has an inner contour that corresponds to the inner contour in the receiving rail 24 along which the overhead adapters 28 are conveyed. This ensures trouble-free conveying of the overhead adapters 28 onto the receiving rail 24 and away from the receiving rail 24.

The coupling members 25, 26 have two pivotably interconnected parts 53, 54. The two parts 53, 54 are designed like hollow profiles and have a hollow profile corresponding to the rails 24, 30 and 50 respectively. The first part 53 is fixed to a conveyor rail 30 or a return rail 50 about a first pivot axis 55. The two parts 53, 54 are pivotably connected to each other at a second pivot axis 56. The second pivot axis 56 is oriented in particular parallel to the first pivot axis 55.

For the pneumatic actuation of the coupling members 25, 26, a pneumatic actuator is used in each case, in particular a pneumatic cylinder 57, which is fastened with a first end to the overhead conveyor system, i.e. the conveyor rail 30 or the return rail 50. The second end of the pneumatic cylinder 57 is attached to the respective coupling member 25, 26, in particular to both the first part 53 and the second part 54.

The coupling process of the transport trolley 13 in the trolley station 12 is explained in more detail below. The transport trolley 13, which is loaded with the overhead adapters not shown in FIGS. 11 and 12 and the articles attached thereto, is moved towards the trolley station.

Figure 11:
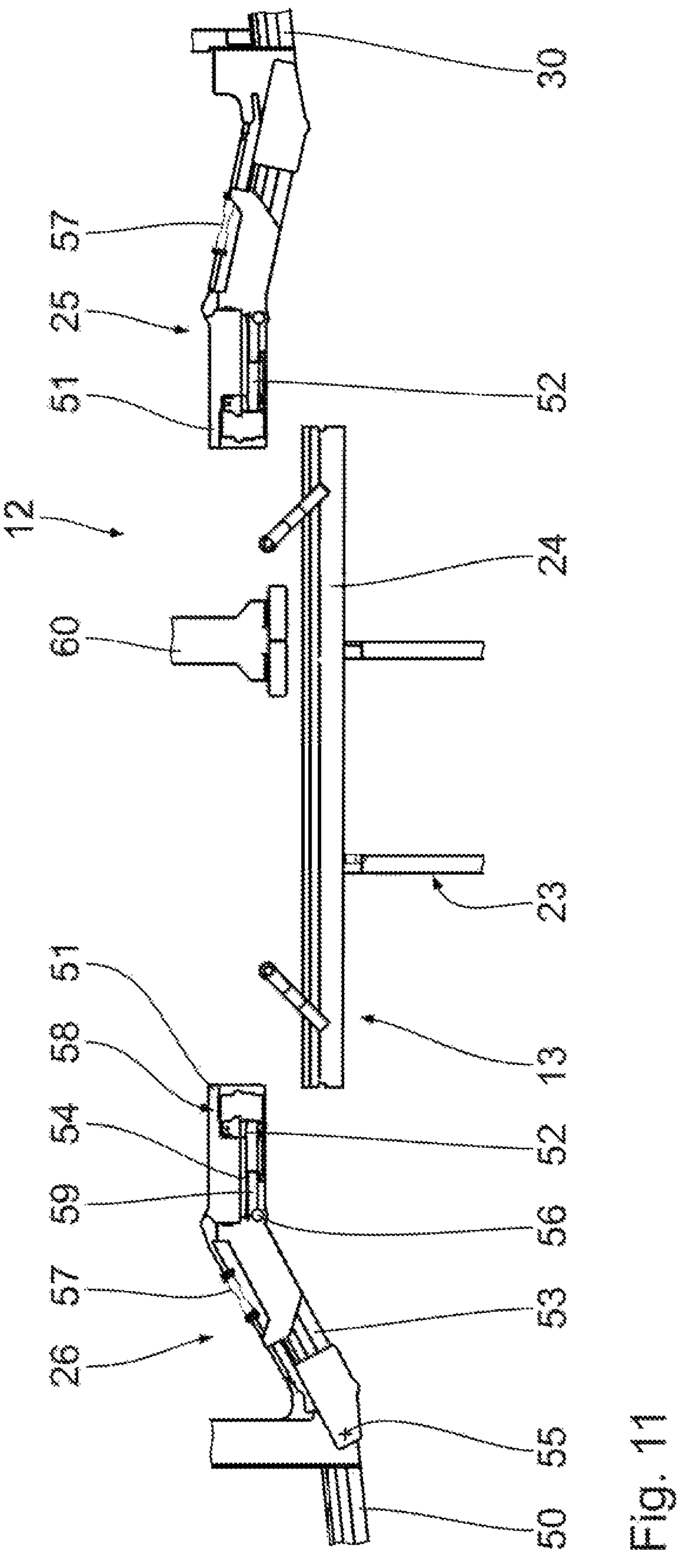
FIG. 11 shows a detailed view of a trolley station according to FIG. 2 in an uncoupled state of the transport trolley.
Figure 12:
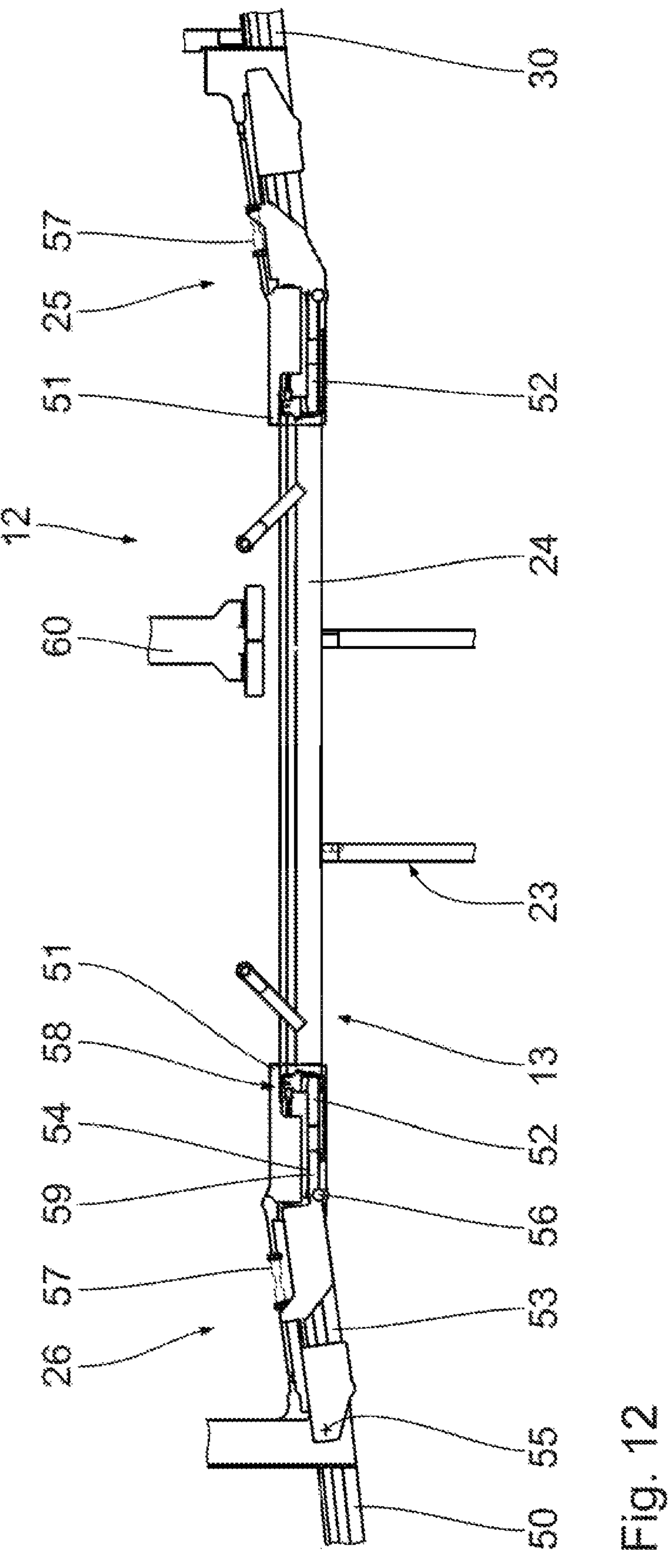
FIG. 12 shows an illustration corresponding to FIG. 11 with the transport trolley coupled in the trolley station.

A roller block, which is not shown in FIGS. 11 and 12, is arranged on the trolley station 12 and has four rollers, each of which is arranged in two roller pairs. A guiding gap is formed between the pairs of rollers, which is directed perpendicularly to the orientation of the receiving rail 24, i.e. in particular parallel to the guide profile 60.

The transport trolley 13 is pushed into the trolley station 12 along this guiding gap. This push-in movement is additionally guided by the guide profile 60, which is stabilised in a guide receptacle of the trolley station 12 that is not shown in more detail.

The trolley station 12 has stop elements, not shown in more detail, which enable rough positioning of the transport trolley 13 along the direction determined by the guiding gap. In this arrangement, the transport trolley is locked in the transverse direction to the receiving rail 24 by means of a locking unit 44. A fine positioning of the transport trolley 13 in the trolley station 12 along the transverse direction to the receiving rail 24 can be carried out by means of actuating members not shown in more detail, in particular pneumatic actuating members and in particular pneumatic cylinders.

The trolley station 12 and the transport trolley 13 allow the transport trolley 13 to be fed in both directions along the guiding gap of the roller block.

While the transport trolley 13 is pushed laterally into the trolley station 12, the coupling members 25, 26 are in the uncoupling position shown in FIG. 11. In particular, the two second parts 54, each facing the receiving rail 24, are spaced vertically upwards from the receiving rail 24. To couple the transport trolley 13 in the trolley station 12, on the basis of FIG. 11, the pneumatic cylinders 57 are first activated and the coupling members 25, 26 are pivoted into the arrangement shown in FIG. 12, i.e. into the coupling position. The pivoting process takes place until each of the second parts 54 rests with the upper support ridge 51 against an upper edge of the receiving rail 24. This coupling process is facilitated by the mouth funnel of the U-shaped receptacle. Due to the kinematics of the coupling members 25, 26, in particular due to the double pivotability about the pivot axes 55, 56, it is ensured that the upper edge of the support ridge 51 is always oriented parallel to the upper edge of the receiving rail 24. By means of the coupling members 25, 26 a reliable and mechanically stable, in particular kink-free coupling is ensured.

Due to the double pivotability of the coupling members 25, 26, which are essentially Z-shaped, it is ensured that the coupling members 25, 26 do not touch the receiving rail 24 on the front side during the displacement movement from FIG. 11 to FIG. 12 or that contact on the front side only occurs immediately before the end of the coupling movement.

The bridging element 52 is then displaced axially by means of the actuating member 59, in particular towards the receiving rail 24. This axial adjusting movement ensures that a gap-free transition from the conveyor system of the facility 1 to the receiving rail 24 of the transport trolley 13 is ensured along the conveying direction 27. In particular, the bridging elements 52 deactivate locking members which are integrated in the receiving rail 24 and are not shown in detail in FIGS. 11 and 12. The locking members ensure that overhead adapters held on the receiving rail 24 are not unintentionally lost when the transport trolley 13 is transported towards or away from the trolley station 12.

When the locking members in the receiving rail 24 have been unlocked, loading and/or unloading of the receiving rail 24 is possible.

A preparation buffer 29 is arranged upstream of a conveying direction 27 of the overhead adapters 28 with respect to the trolley station 12. The preparation buffer 29 is coupled to the trolley station 12 in terms of conveying technology.

The preparation buffer 29 serves to prepare individual goods of at least one order. For this purpose, the preparation buffer 29 has a conveyor rail 30 on which the individual goods 2 can be arranged in a suspended manner by means of a respective overhead adapter 28 and in particular can be conveyed in a suspended manner.

According to the embodiment example shown, the conveyor rail 30 of the preparation buffer 29 is inclined relative to the horizontal towards the trolley station 12. Overhead adapters 28 are conveyed along the conveyor rail 30 of the preparation buffer 29, in particular automatically as a result of gravity, towards the trolley station 12. An angle of inclination of the conveyor rail 30 relative to the horizontal provided for this purpose is between 1° and 15°, in particular between 5° and 10°. The inclined arrangement of the conveyor rail 30 is not shown in FIG. 2 for reasons of illustration. Additionally or alternatively, the preparation buffer 29 can have a conveyor drive to actively convey the overhead adapters 28 along the conveyor rail 30. The conveyor drive can be provided in particular in addition to the inclined arrangement of the conveyor rail 30.

The preparation buffer 29 has a sliding drive 31. The sliding drive 31 makes it possible to convey overhead adapters 28 along the conveyor rail 30 and/or along the receiving rail 24. For this purpose, the sliding drive 31 has a plurality of sliding members 32 which can be mechanically coupled to the overhead adapters 28 arranged in the rails 24, 30. In particular, the sliding elements 32 serve to be arranged behind the overhead adapter 28 to be conveyed in the conveying direction 27 and to be brought into engagement with the overhead adapter 28. The sliding drive 31 further comprises a drive means 33 in the form of a chain drive to which the sliding members 32 are attached. By actuating the drive means 33, the sliding elements 32 are displaced along the rails 24, 30 and entrain the overhead adapters 28 arranged in the rails 24, 30. For this purpose, the sliding elements 32 are in particular arranged on the rails 24, 30 such that they can come into direct contact with the overhead adapters 28, at least in certain regions. The drive means 33 is in particular designed and arranged on the rails 24, 30 such that sliding the overhead adapters 28 off the conveyor rail 30 and/or from the receiving rail 24 is ensured.

A front rotary switch 34 and a rear rotary switch 35 are used to mechanically couple one sliding element 32 each to the receiving rail 24 and/or the conveyor rail 30. The rotary switches 34, 35 are fastened to the conveyor rail 30. The front rotary switch 34 is arranged at an end of the preparation buffer 29 facing the trolley station 12. The rear rotary switch 35 is arranged at an end of the conveyor rail 30 facing away from the trolley station 12.

The preparation buffer 29 has a stopping member 36. By means of the stopping member 36, the overhead adapters 28 can be stopped on the conveyor rail 30. A gravimetric conveyance caused by the inclination of the conveyor rail 30 is thus prevented. The stopping member 36 is arranged at the conveyor rail 30 and in particular upstream of the front rotary switch 34. The stopping member 36 is arranged in the conveying direction 27 between the rear rotary switch 35 and the front rotary switch 34.

The preparation buffer 29 has a plurality of sensor elements 37, 38, 39. The sensor elements 37, 38, 39 are each designed identically, but can also be designed differently. The sensor elements 37, 38, 39 are designed in particular as light barriers and in particular as light grids.

The sensor elements 37, 38, 39 are in particular attached to the conveyor rail 30 and enable the detection of an overhead adapter on the conveyor rail 30 in the region of the respective sensor element 37, 38, 39. The sensor elements 37, 38, 39 are arranged at a distance from each other along the conveyor rail 30 with respect to the conveying direction 27.

The first sensor element 37 arranged at the front with respect to the conveying direction 27 serves to detect a first filling level of the conveyor rail 30. The first sensor element 37 is arranged in particular such that the first filling level corresponds to half of the maximum filling level of the conveyor rail 30. It is possible to attach the first sensor element 37 to the conveyor rail 30 at a different position with respect to the conveying direction 27, for example in order to detect a different filling level, for example two-thirds or three-quarters.

The second sensor element 38 is arranged upstream with respect to the first sensor element 37 in relation to the conveying direction 27. The second sensor element 38 enables the level to be detected when the conveyor rail 30 is completely filled. In particular, the second sensor element 38 is arranged such as to detect a filling level which corresponds to the capacity of the receiving rail 24 of the transport trolley 13. The capacity of the receiving rail 24 determines a maximum permissible filling level for the conveyor rail 30.

The third sensor element 39 is arranged upstream of the first sensor element 37 and/or the second sensor element 38 in relation to the conveying direction 27. The third sensor element 39 serves to detect an overfilling of the conveyor rail 30. An overfilling is present when the current filling level of the conveyor rail 30 exceeds the maximum filling level.

The sensor elements 37, 38, 39 are arranged in the conveying direction 27, in particular between the two rotary switches 34, 35.

Upstream of the conveying direction 27, a supply station 40 is arranged with respect to the preparation buffer 29 and coupled with the preparation buffer 29. The supply station 40 has a supply line 41 by means of which overhead adapters 28 with individual goods 2 conveyed thereon in a suspended manner can be supplied to the preparation buffer 29. Similar to the conveyor line 30, the supply line 41 can also be arranged inclined with respect to the horizontal. Additionally or alternatively, the supply line 41 can have a separate conveyor drive.

At an end facing the preparation buffer 29, the supply line 41 has a separating unit 42 which enables the overhead adapters 28 to be discharged separately from the supply station 40 into the preparation buffer 29. An identification unit 43 is arranged at the separating unit 42 and in particular integrated in the separating unit 42. The identification unit 43 enables an identification of the overhead adapters 28, which are conveyed past the identification unit 43 along the conveying direction 27 and fed to the preparation buffer 29.

The trolley station 12 has a locking unit 44. The locking unit 44 has an upper suspension 45 which extends along the conveying direction 27. A locking member 47 is arranged on each side of the upper suspension so that it can move in relation to a transport direction 46 of the transport trolley 13. The locking members 47 are flap-like or plate-like and bound an intermediate space 48 in the transport direction 46, in which the transport trolley 13 can be arranged with the receiving rail 24. According to the embodiment example shown, the locking members 47 are pivotable about an upper, in particular horizontally extending pivot axis. It is also conceivable that the locking members 47 are designed to be displaceable with respect to a vertical direction.

The locking members 47 each have an insertion slope 49. In particular, the insertion slopes 49 are each designed such that they can be passively deflected by the transport trolley 13, which is moved along the transport direction 46 towards the trolley station 12.

In relation to the conveying direction 27, a return line 50 is connected to the trolley station 12 downstream of the trolley station 12. The return line 50 is used to return emptied overhead adapters and/or emptied conveyor bags to the loading station 6. In the following, a method for picking and packing individual goods conveyed overhead is explained in more detail with reference to FIGS. 2 to 12.

The individual goods 2 are conveyed overhead in the overhead conveyor facility 16 and sorted by order in the supply station 40 by means of the sorting unit 8. By means of the separating unit 42, the overhead adapters 28 concerning the individual goods 2 are first held up on the supply line 41 in the supply station 40.

As soon as the preparation buffer 29 is released, i.e. has a capacity to feed individual goods 2 arranged at overhead adapters 28 to the preparation buffer 29, the separating unit 42 releases the overhead adapters 28 in the supply station 40 so that the preparation buffer 29 is successively filled with the overhead adapters and the individual goods 2 arranged thereon. The current filling level of the conveyor line 30 is monitored by means of the sensor elements 37, 38. As soon as a critical filling level has been reached, the sensor elements 37 and/or 38 transmit a corresponding signal to the control unit 9, which then transmits a control signal to the separating unit 42 and prevents further overhead adapters 28 from being supplied into the preparation buffer 29.

The preparation buffer 29 is filled in particular such that only overhead adapters 28 with individual goods 2 that form a completed order are fed. Since the length of the conveyor rail 30 along the conveying direction 27 is known a priori, it is possible in particular to select in advance the overhead adapters that are to be transferred to the preparation buffer 29 for the next filling process. It is therefore possible, in particular, to carry out the filling process independently of the sensor elements 37, 38 when the intended overhead adapters 28 have been conveyed into the preparation buffer 29.

The stopping member 36 prevents the overhead adapters 28 fed to the preparation buffer 29 from unintentionally leaving the preparation buffer 29. By means of the stopping member 36, the overhead adapters 28 are reliably held in the preparation buffer 29.

By means of the identification unit 43, it is monitored which overhead adapters 28 have been fed to the preparation buffer 29. This ensures that only the overhead adapters 28 that form a complete order are arranged in the preparation buffer 29. To pick up the individual goods 2, a transport trolley 13 is transported into the trolley station 12. When the transport trolley 13 is fed into the trolley station 12, either the locking member 47 facing the trolley is actively moved so that the transport trolley 13 can be moved into the locking position shown in FIG. 4. Alternatively, it is conceivable that the locking member is arranged to oscillate freely about the horizontal pivot axis and that the locking member 47 is deflected, in particular pivoted, against the force of gravity by contact of the transport trolley with the insertion slope 49. As soon as the transport trolley is in the locking position shown in FIG. 5, the locking member 47 is displaced back into the locking position. This shifting back can take place automatically, in particular due to gravity. It is also possible that a separate locking drive is provided for this purpose. It is also possible that the transport trolley 13 is already arranged in the trolley station 12 and coupled by means of the coupling members 25, 26 in the trolley station 12. In the coupled arrangement, the receiving rail 24 and the conveyor rail 30 form a common conveyor line for the overhead conveyor adapter 28.

Figure 5:
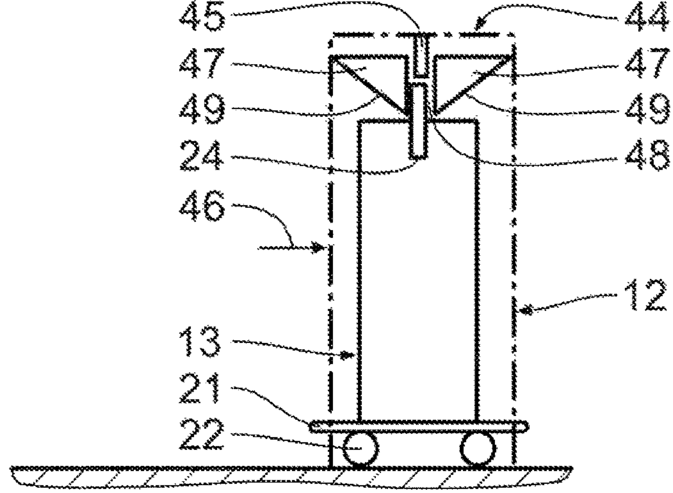
Figure 6:
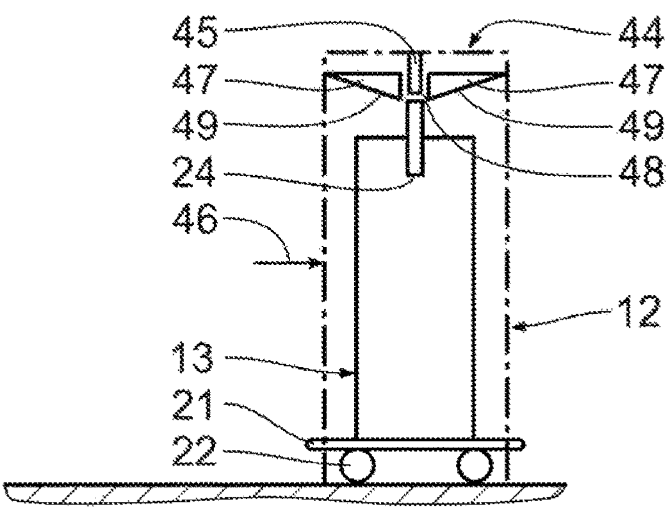
FIG. 6-8 show an illustration corresponding to FIG. 3 of unlocking and removing the transport trolley from the trolley station.
Figure 7:
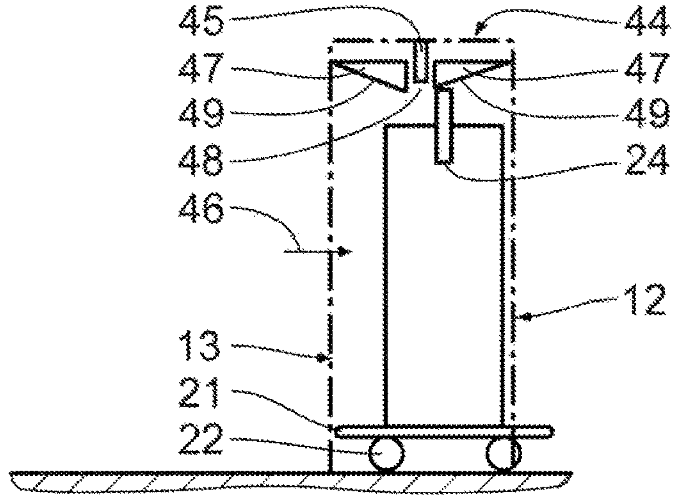
Figure 8:
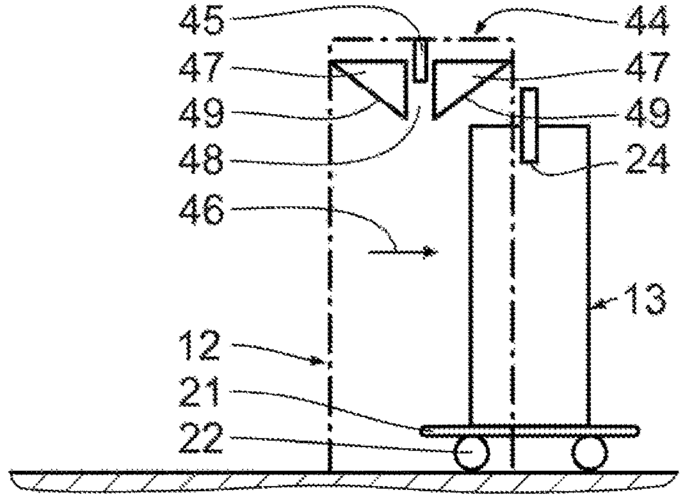
Figure 9:
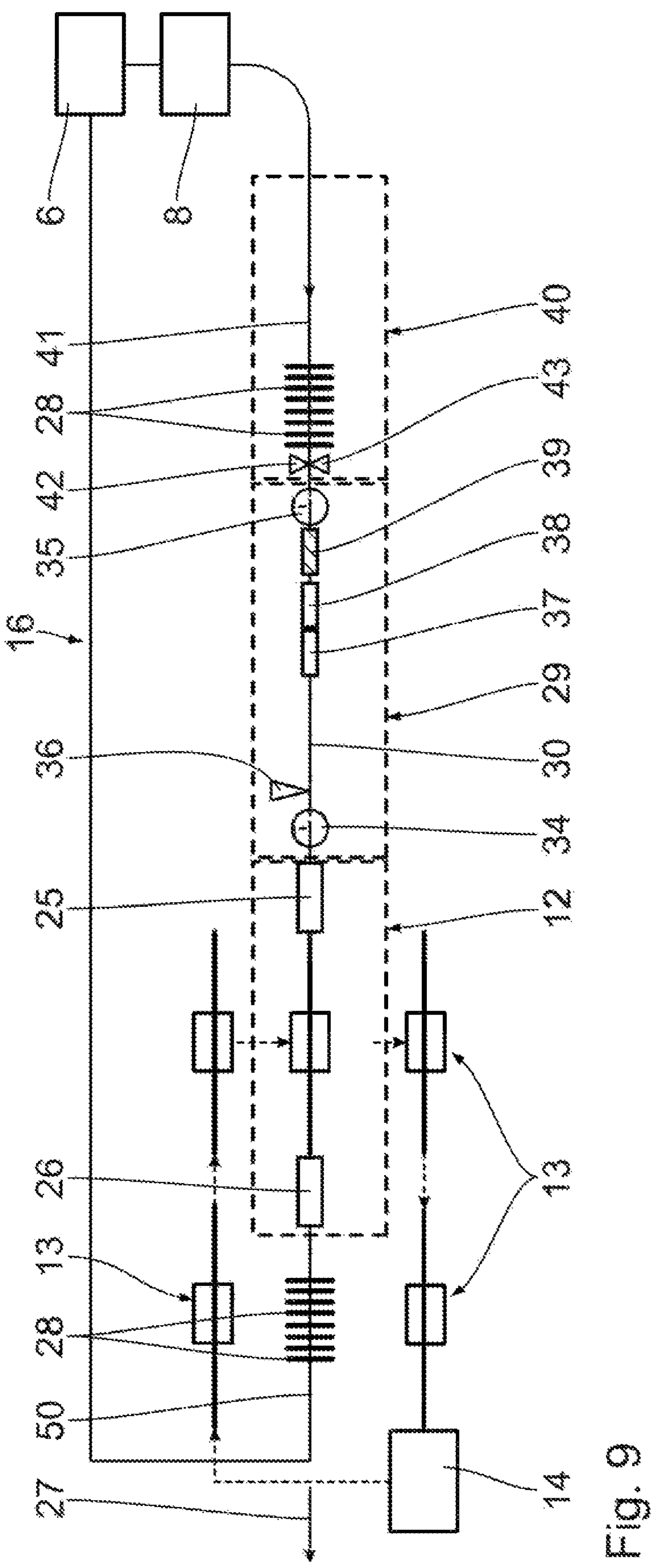
FIG. 9 shows a view corresponding to FIG. 2 with a transport trolley in the trolley station.

As soon as the transport trolley 13 is in the locking position according to FIG. 5 and in particular individual goods 2 of at least one complete order are arranged in the preparation buffer 29, these are conveyed from the preparation buffer 29 onto the transport trolley 13 in the trolley station 12. The sliding drive 31 and in particular the rear sliding element 32, which is arranged facing the supply station 40, are used for this purpose. The rear sliding element 32 is coupled to the drive means 33 by means of the rear rotary switch 35 and then displaced along the conveying direction 27. This allows the overhead adapters 28 to be slid from the conveyor rail 30 onto the receiving rail 24.

In particular, the preparation buffer 29, especially the conveyor rail 30, is filled again, especially while the overhead adapters 28 are slid from the conveyor rail 30 onto the receiving rail 24. A method of this type is particularly efficient.

As soon as the individual goods 2 of the completed orders are arranged at the receiving rail 24 of the transport trolley 13, the transport trolley 13 is mechanically uncoupled from the trolley station 12 at the coupling members 25, 26 and transported away from the trolley station, in particular by means of a vehicle or manually. It is advantageous if the transport trolley 13 has an identification means, in particular a barcode, which can be read automatically by means of an identification unit not shown. In particular, this makes it possible to logically link the individual goods 2 arranged on the transport trolley 13, i.e. loaded onto the transport trolley 13 in the trolley station 12, with the transport trolley 13. This makes it possible to unambiguously assign the individual goods 2 to the transport trolley 13 even after the individual goods 2 have been uncoupled from the overhead conveyor facility. The security during the transport of the individual goods 2 and the picking of the individual goods 2 is increased. For this purpose, one of the locking members 47 is moved into a release position by means of the locking drive, which allows the transport trolley 13 to be moved out of the locking position. In particular, only one of the locking members 47 is released for removing the transport trolley 13. This ensures that the transport trolley 13 is transported away in a desired transport direction. The risk of a collision with other transport trolleys is thus reduced and in particular avoided.

The transport trolley 13 with the overhead adapters 28 arranged thereon, which are not shown in FIGS. 3 to 8 for reasons of illustration, is transported from the trolley station 12 to one of the packing places 14 and unloaded there, in particular in a manual manner. This means that hanging goods with hangers are removed from the overhead adapters and lying goods are removed from the conveyor bags 7. The removed individual articles 2 are packed into a shipping container and prepared for shipping and transported to the outgoing goods zone 18. The transport trolley 13 with the empty overhead adapters 28 and/or the empty conveyor bags 7 is conveyed from the packing places 14 back to the trolley station 12 and coupled there. Before the individual goods 2 of new orders are slid onto the transport trolley 13, the empty overhead adapters 28 and the empty conveyor bags 7 are slid off the receiving rail 24 along the conveying direction 27 by means of the sliding drive 31, in particular by means of the front sliding element 32. The front rotary switch 34 serves to couple the front sliding element 32. The slid-off empty overhead adapters 28 and/or empty conveyor bags 7 are returned to the loading station 6 via the return line 50.

According to the embodiment example shown, the trolley station 12 thus forms a filling station for filling the receiving rail 24 with individual goods 2 conveyed overhead. However, the trolley station 12 also constitutes an emptying station for emptying the receiving rail 24. The trolley station 12 is a combined filling/emptying station. The combined filling/emptying station 12 is designed to be particularly compact. The investment required for this facility is reduced.

After the transport trolley 13 of the trolley station 12 has been emptied, a new filling process can begin as described above.

Figure 10:
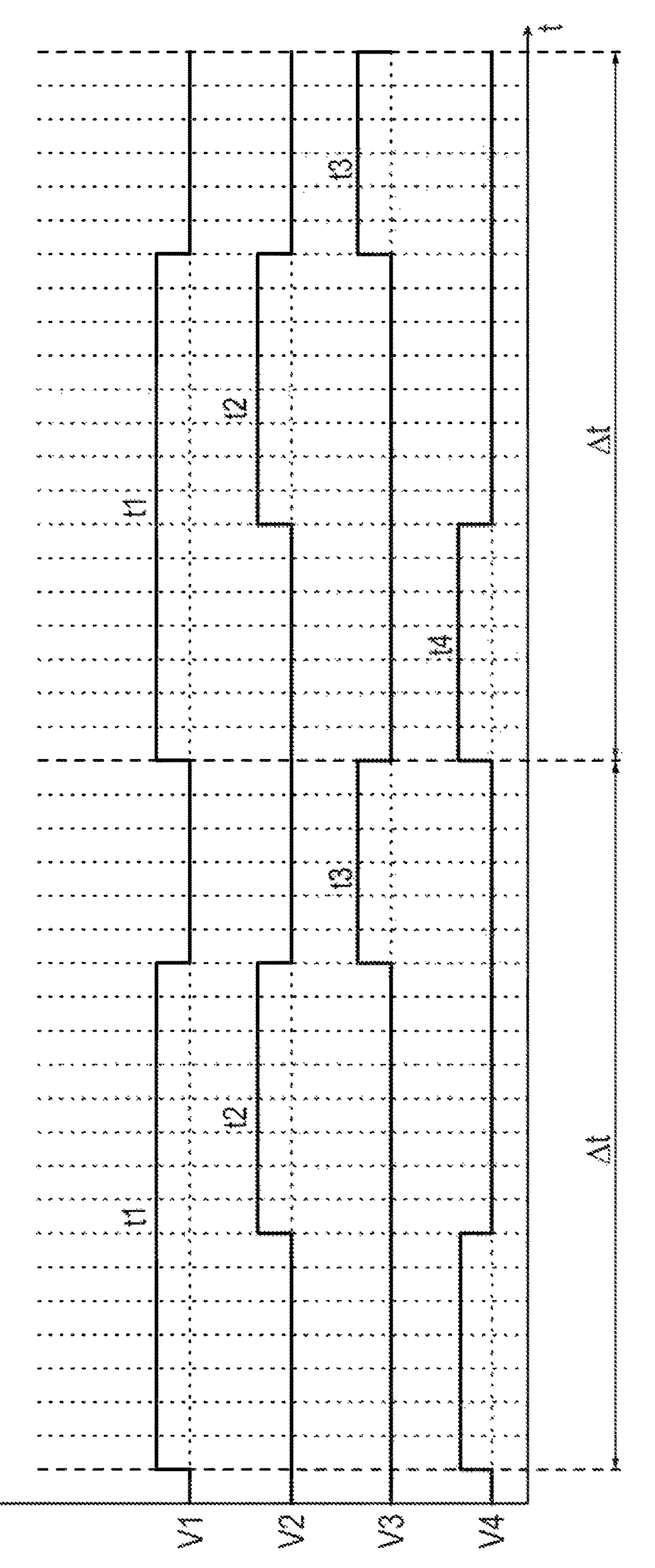
FIG. 10 shows an illustration of the functional relationship of the time sequences at the facility according to FIG. 9.

The time sequences of the various method steps are shown together in a time diagram in FIG. 10. In the diagram, the time t is shown along the abscissa axis. The various method steps are shown along the ordinate. The filling of the preparation buffer is designated as the first method step V1. Filling the preparation buffer requires a time t1. The unloading of the transport trolley 13 is designated as the second method step V2. Unloading the transport trolley 13 requires a time t2. The loading of the transport trolley 13 is described as the third method step V3. The changing of the transport trolley 13, in particular by means of a driverless transport system, is referred to as the fourth method step V4. Changing the transport trolley 13 takes a time t4. A complete method cycle is marked along the time axis with At. From the illustration in FIG. 10 it can be seen in particular that a number of method steps can be carried out at the same time and thus in a time-saving manner. In particular, it is possible for the preparation buffer 29 to be filled with individual goods 2 (V1) and meanwhile the transport trolley 13 is first exchanged and emptied as soon as the transport trolley 13 is coupled (V4). As soon as the emptying of the transport trolley 13 and in particular the filling of the preparation buffer 29 have been completed, the filling of the transport trolley 13 can take place in the third method step, which requires a comparatively small amount of time t3. In particular, it is thus possible to empty the transport trolley and exchange the transport trolley 13 while the preparation buffer 29 is being filled with individual goods 2. A method of this type is particularly efficient.

A second embodiment example of the invention is described below with reference to FIG. 13. Constructively identical parts are given the same reference numerals as in the first embodiment example, the description of which is referred to here. Constructively different but functionally similar parts are given the same reference numerals with a trailing letter a.

One difference compared to the previous embodiment example is that the facility has two trolley stations 12*a*, 20, which are arranged one behind the other along the transport direction 46 of the transport trolleys 13.

Figure 13:
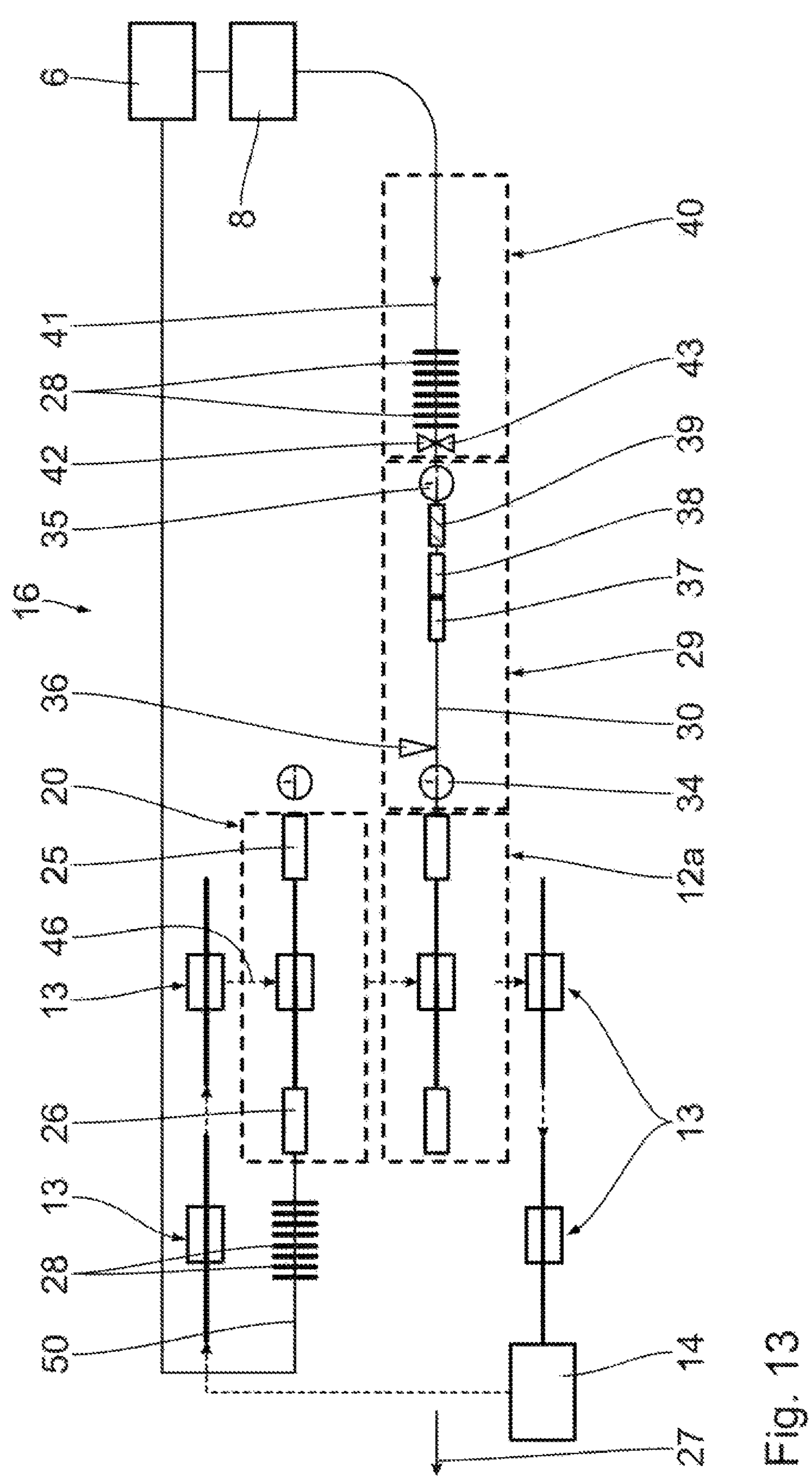
FIG. 13 shows an illustration corresponding to FIG. 9 of a facility according to a further example of an embodiment.

The trolley station 20 shown in FIG. 13 above, which is upstream of the other trolley station 12*a* along the transport direction 46, serves as an emptying station for the transport trolleys 13. The downstream trolley station 12*a* serves as a filling station for the transport trolleys 13.

The emptying process and the filling process are decoupled from each other in terms of the facility. This means that the cycle time At can be additionally shortened, as the emptying and filling of the transport trolleys 13 can be carried out simultaneously in different trolley stations 12*a*.

Investigations by the applicant have shown that up to 5000 overhead adapters 28 can be transported from the trolley station 12*a* to the packing places 14 and unpacked by means of the transport trolleys 13.

Figure 14:
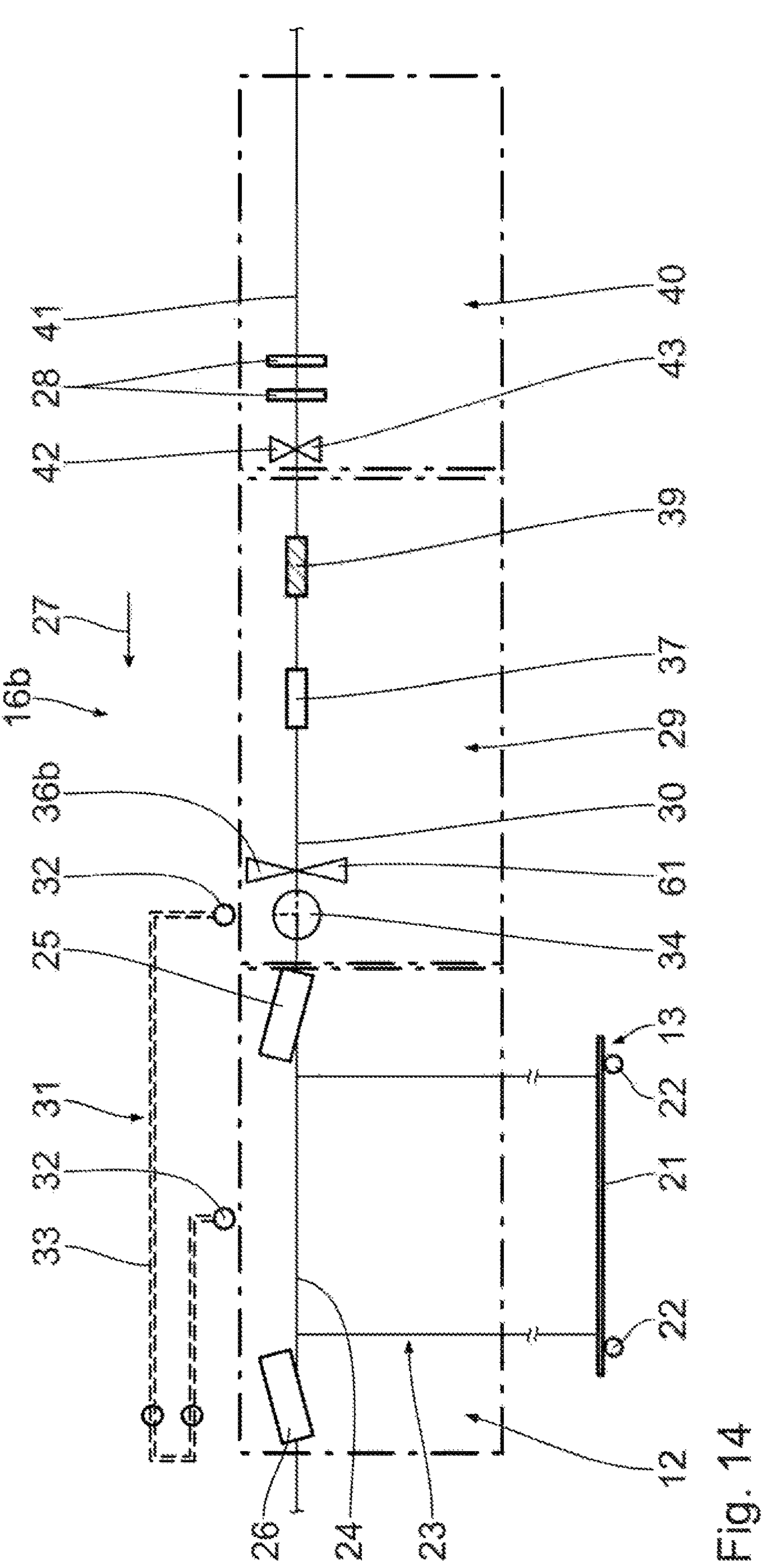
FIG. 14 shows an illustration corresponding to FIG. 2 of a facility according to a further embodiment example.

In the following, a third embodiment example of the invention is described with reference to FIG. 14. Constructively identical parts are given the same reference numerals as in the first two embodiment examples, the description of which is referred to here. Constructively different but functionally similar parts are given the same reference numerals with a trailing letter b.

One difference compared to the first embodiment example is that only one, namely the front rotary switch 34, is used to slide the overhead adapters onto the transport trolley 12 or to slide overhead adapters off the transport trolley 12 by means of a sliding member not shown in more detail. This makes the overhead conveyor facility 16*b* less complicated. In particular, facility components can be saved.

Compared to the first embodiment example, in particular the second sensor element is not required.

According to this embodiment example, the stopping member 36*b* represents a further separating unit, which can be designed with a further identification unit 61, in particular corresponding to the separating unit 42 on the supply line 41. The further identification unit 61 can also be designed to be integrated into the separating unit 36*b*.

What is claimed is:

1. A facility for order picking and packing individual goods comprising;

a. a preparation buffer having a conveyor rail for preparing the individual goods of at least one order, wherein the individual goods can each be conveyed in a suspended manner along the conveyor rail by means of an overhead adapter, b. a transport trolley which i. is configured to be mobile, ii. has a receiving rail on which the overhead adapters carrying the individual goods of the at least one order are received, c. a trolley station which is rail to rail connected to the preparation buffer such that the transport trolley is coupled to the preparation buffer by means of the trolley station such that a receiving rail of the transport trolley is physically connected to a conveyor rail of the preparation buffer, wherein the connection of the transport trolley in the trolley station enables transfer of individual goods from the preparation buffer onto the transport trolley so as to enable conveying individual goods.

2. The facility according to claim 1, comprising a plurality of packing places for packing the individual goods into orders.

3. The facility according to claim 1, comprising an emptying station for emptying the transport trolley.

4. The facility according to claim 1, comprising a sliding drive for sliding the individual goods from the preparation buffer onto the transport trolley.

5. The facility according to claim 1, comprising an identification unit for identifying the individual goods.

6. The facility according to claim 1, wherein the identification unit is located upstream of the preparation buffer.

7. The facility according to claim 1, comprising a control unit for at least one of the group comprising automated provision of the individual goods in the preparation buffer, for automated coupling and for loading of the transport trolley with the individual goods.

8. A facility for order picking and packing individual goods comprising:

a. a preparation buffer having a conveyor rail for preparing the individual goods of at least one order, wherein the individual goods can each be conveyed in a suspended manner along the conveyor rail by means of an overhead adapter, b. a transport trolley which i. is designed to be mobile, ii. has a receiving rail, which is configured to receive the overhead adapters carrying the individual goods of the at least one order, c. a trolley station which is rail to rail connected to the preparation buffer such that the transport trolley is coupled to the preparation buffer by means of the trolley station such that a receiving rail of the transport trolley is physically connected to a conveyor rail of the preparation buffer, wherein the connection of the transport trolley in the trolley station enables transfer of individual goods from the preparation buffer onto the transport trolley so as to enable conveying individual goods, wherein the trolley station has at least one coupling member which is switchable between a coupling position and an uncoupling position.

9. A facility for order picking and packing individual goods comprising a. a preparation buffer having a conveyor rail for preparing the individual goods of at least one order, wherein the individual goods can each be conveyed in a suspended manner along the conveyor rail by means of an overhead adapter, b. a transport trolley which i. is designed to be mobile, ii. has a receiving rail for receiving the overhead adapters carrying the individual goods of the at least one order, c. a trolley station which is rail to rail connected to the preparation buffer such that the transport trolley is coupled to the preparation buffer by means of the trolley station such that a receiving rail of the transport trolley is physically connected to a conveyor rail of the preparation buffer, wherein the connection of the transport trolley in the trolley station enables transfer of individual goods from the preparation buffer onto the transport trolley so as to enable conveying individual goods, and d. a locking unit for locking the transport trolley in the trolley station, wherein the locking unit has at least one locking member which can be switched between a locking position and an unlocking position.

* * * * *